United States Patent [19]

Schumacher

[11] Patent Number: 4,786,763

[45] Date of Patent: Nov. 22, 1988

[54] CIRCUIT ARRANGEMENT FOR THE TRANSMISSION OF DATA SIGNALS BETWEEN SUBSCRIBER TERMINALS OPERATING WITH DIFFERENT DATA TRANSMISSION PROCEDURES

[75] Inventor: Hinrich Schumacher, Munich, Fed. Rep. of Germany

[73] Assignee: Siemens Aktiengesellschaft, Berlin and Munich, Fed. Rep. of Germany

[21] Appl. No.: 175,025

[22] Filed: Mar. 30, 1988

[30] Foreign Application Priority Data

Apr. 10, 1987 [DE] Fed. Rep. of Germany ....... 3712130

[51] Int. Cl.$^4$ ............................................. H04Q 3/00
[52] U.S. Cl. ..................................... 178/2 R; 178/3; 370/41
[58] Field of Search ................. 178/3, 2 B, 2 R, 17.5; 370/41, 42, 91, 61

[56] References Cited

U.S. PATENT DOCUMENTS 4,323,728  4/1982  Bergmann et al. ..................... 178/3

FOREIGN PATENT DOCUMENTS 2534110  7/1975  Fed. Rep. of Germany .

OTHER PUBLICATIONS

Article entitled, "The Structure of the Siemens EDS System", by Eduard Mair, Bernhard and Rolf Schubert (1977), No. 7, pp. 295–301.

Primary Examiner—Stafford D. Schreyer
Attorney, Agent, or Firm—Jeffrey P. Morris

[57] ABSTRACT

A circuit for the transmission of data signals between subscriber terminals operating with different data transmission procedures is described. Data signals are transmitted between a subscriber terminal operating with a first transmission procedure and a subscriber terminal operating with a second transmission procedure, attainable only through manually switched connections. A manual switchboard having at least one job memory unit and a control unit is provided. Jobs for connections to be manually switched, respectively containing at least a job number, as well as selection data, serving for the establishment of connections and data signals to be transmitted, are written into the job memory unit. These jobs are output in the sequence in which they were input, such that the control unit maintains, for each job, only the selection data required for the setting-up of a connection and the associated data signals for a conversion and related forwarding. The described invention is applicable to the transmission of data signals between Teletex-subscriber terminals and teleprinter-subscriber terminals, attainable only over manually switched connections.

4 Claims, 1 Drawing Sheet

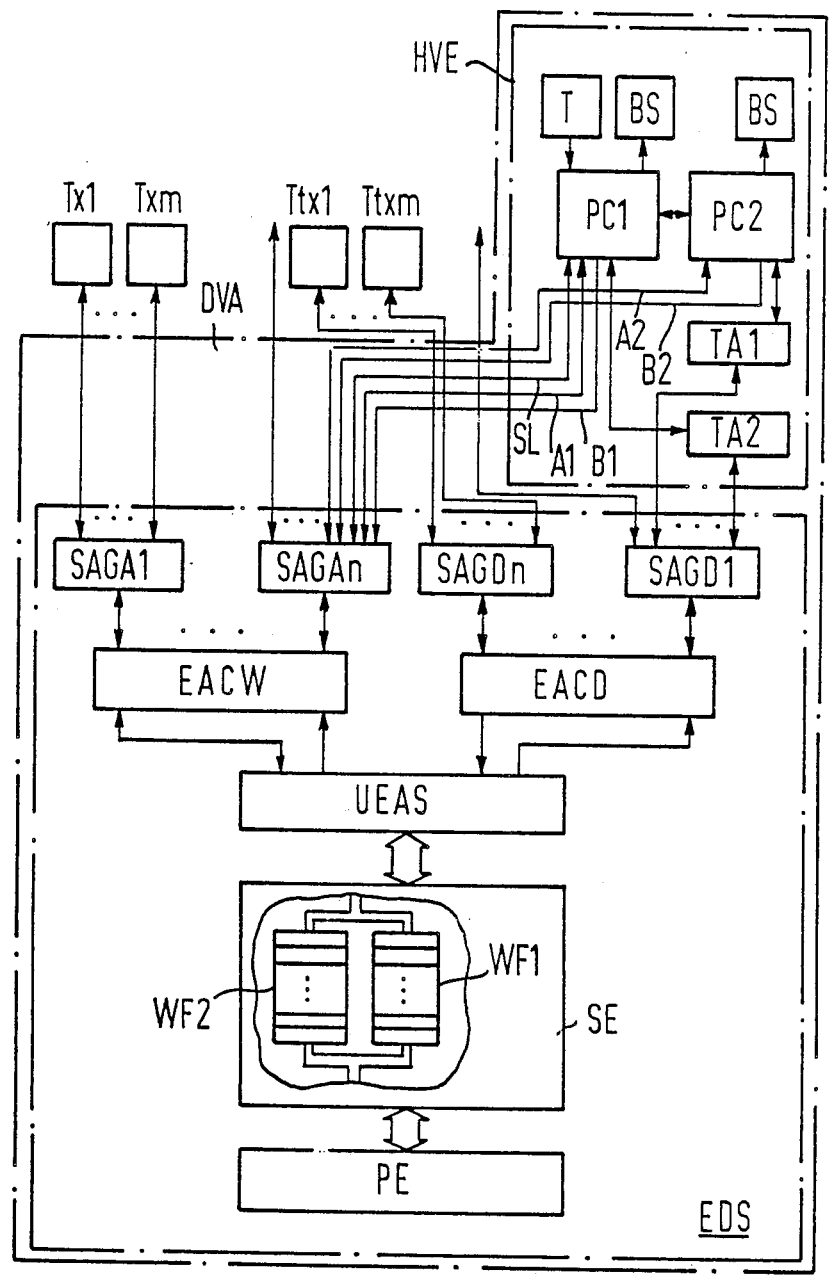

4,786,763

CIRCUIT ARRANGEMENT FOR THE TRANSMISSION OF DATA SIGNALS BETWEEN SUBSCRIBER TERMINALS OPERATING WITH DIFFERENT DATA TRANSMISSION PROCEDURES

CROSS REFERENCE TO RELATED APPLICATION

Hinrich Schumacher, Ser. No. 175,025, 3-30-88 filed on even date herewith, titled Circuit Arrangement for Connecting Subscriber Terminals.

BACKGROUND OF THE INVENTION

1. Field of the Invention

The present invention relates to a circuit for the transmission of data signals between a first subscriber terminal operating with a first data transmission protocol and a second subscriber terminal operating with a second data transmission protocol different from the first data transmission protocol, through a data switching system wherein conversion of the respective data signals from the first subscriber terminal into the data signals compatible to the second subscriber terminals, such that the first subscriber terminal and the second subscriber terminal are connected to separate line adapters of a first or a second group of line adapters.

2. Description of the Prior Art

Circuits of the above described type are known in the prior art, an example of which is German patent DE-PS No. 29 12 649. In this prior art circuit arrangement, a conversion unit, connected to the line adapter of each group of line adapters is provided for the conversion of data signals which are to be transmitted between subscriber terminals having different transmission procedures or protocols. In this conversion unit are input all data signals output from the subscriber terminal operating with a first transmission procedure or protocol. At the same time these data signals are output and sent on to the subscriber terminal with a second transmission protocol differing from that of the first data transmission protocol. Such conversion units are only insertable in data networks over which networks connections between subscriber terminals are established automatically through the use of predetermined switching procedures, ie: in automatic dialing traffic. Internationally however, there still exist data networks with switching facilities designed for non-standard switching procedures. Transition to these types of data networks, through integration with the conversion units known in the prior art, are not possible.

The common carriers operate data networks with standardized transmission procedures, and at present also provide manual switchboards in addition to automatic dialing systems to make transitions to data nets operating with non-standard switching procedures possible. However, until applicants invention, no conversion of data signals has been provided for in such transitions.

In connection with the operation of such manual switchboard positions, a method for the call allocation of calls waiting for released manual switchboard positions is already known in the art, as described in German patent DE-PS No. 25 34 110. In this known method, the waiting calls are entered in a job memory before processing. The individual calls can thereby be allocated different priorities. Upon the release of the manual switchboard positions, the calls are output in the sequence of their input, taking into account the established priorities for processing through the released manual switchboard positions.

The present invention discloses a circuit by means of which data signals may be transmitted between a subscriber terminal operating with a first data transmission protocol and a subscriber terminal operating with a second data transmission protocol which is only attainable by means of a manually switchable connection.

SUMMARY OF THE INVENTION

The present invention describes a circuit which enables a manual switchboard, having at least one job memory unit and one control unit to be connected to at least one line adapter of each group of line adapters, so that the jobs sent out from the data switching system for manually switched connections, which respectively contain the selection data and the data signals from the first subscriber terminal, are storeably together with a continuously assigned job number, and readable, in the sequence in which they were stored, through the control signals output from a control unit, so that the control unit only maintains the selection data required for establishing of a connection, the appertaining data signals for a conversion and further transmission to the second subscriber terminal.

The present invention provides that connections to be manually switched which involve conversions of the data signals to be transmitted between subscriber terminals operating with different data transmission procedures may be established in a simplified manner. The manual switchboards may be connected to data switching systems with simplified circuitry, so that manual switchboards may be retrofitted to existing data switching systems provided for automatic dial operation, for example, without special circuit modifications being required in such data switching systems.

The present invention is described in detail, in a preferred embodiment in conjunction with a figure, wherein:

BRIEF DESCRIPTION OF THE DRAWING

The figure shows a data switching system DVA in accordance with the invention. teleprinter (Telex) and data switching system EDS, designed for automatic dialing operation, which in general, serves for the switching of data signals, belongs to this data switching system.

DESCRIPTION OF THE PREFERRED EMBODIMENT

Included among the data signals are, by way of example, also teleprinter characters and speech signals encoded in digital form. Two different groups of line adapters of the teleprinter and data switching system are shown. The line adapters SAGA1 through SAGAn, for which only the line adapters SAGA1 and SAGAn are shown, belong to a first group. These line adapters process digital data signals on a polarity reversal basis. For example, on the transmission lines connected thereto, a signal transmission rate of 50 Bd is possible, using the international telegraph alphabet No. 2, suitable for teleprinter transmission. Thus, suitable teleprinter and/or teleprinter subscriber terminals may be connected to these line adapters. In the drawing, teleprinter-subscriber terminals, designated by T×1 through T×m are connected to the line adapter SAGA1.

The second group of line adapters include the line adapters SAGD1 through SAGDn, of which only the line adapters SAGD1 and SAGDn are shown in the drawing, for simplicity of description. These line adapters process digital data signals in the form of digital bit groups which are also designated as envelopes. For example, data signals corresponding to the international alphabet IA No. 5 can be transmitted and received by these line adapters at a data transmission rate of 2400 bits, in a synchronous data transmission format., Office teletex machines, which are also known as Teletex subscriber terminals, may be connected to the aforementioned line adapters. In the drawing, Teletex-subscriber stations designated by Tt×1 through Tt×m are connected to the line adapter SAGDn.

With reference to the aforementioned line adapters, it is noted that the line adapters are respectively connected to a number of transmission lines which can be used for connecting teleprinter-subscriber terminals and/or Teletex stations or as exchange interconnect lines over which two teleprinter and data switching systems are respectively connected with each other.

Together with the aforementioned line adapters, input/output code converters EACD and EACW, a communications controller unit UEAS, a memory unit SE and lastly a program control unit PE are shown as elements of the teleprinter and electronic data switching system EDS. The combined action of these circuit elements is known in the prior art, for example 'Siemens-Zeitschrift', Volume 2, 1977, Pages 82 through 87.

Referring to the memory unit, a job memory arrangement formed from two job memories WF1 and WF2 with a plurality of memory cells respectively is shown, which will be described in greater detail hereinafter.

A manual switchboard HVE is connected to the indicated line adapter SAGAn via five transmission lines. These transmission lines are used as dedicated lines. A first transmission line SL is configured for bidirectional operation and functions for the transmission of control signals. The remaining transmission lines designated A1, A2, B1 and B2 function for the transmission of data signals. A microprocessor arrangement PC1, in the form of a personal computer is connected to the transmission lines SL, A1 and B1. This microprocessor arrangement includes a control unit, in the form of a keyboard T and a video display BS. Connected to this microprocessor, via a connecting line, is a second microprocessor arrangement PC2 which is also a part of the manual switchboard. This microprocessor, which may also be a personal computer, also uses a video display BS and is connected via the aforementioned transmission lines A2 and B2.

The microprocessors PC1 and PC2 are also coupled to a Teletex-interface circuit TA1 and/or TA2 over a connecting line. Each of these Teletex-interface circuits is coupled to a transmission line of the aforementioned line adaper SAGD1. Additional further manual switchboards may be coupled to the teleprinter data switching system EDS.

The operating mode of the data switching system will now be described in detail. Two operating modes are provided for the manual switchboard HVE. In the first mode, a switching of connections between subscriber terminals, which receive and/or transmit data signals with the same transmission protocol during an ongoing connection results. Such subscriber terminals may, for example be teleprinter-subscriber terminals. In a second operating mode, connections between subscriber terminals are switched which receive and/or transmit data signals having different transmission protocols. These subscriber terminals may, for example be Teletex-subscriber terminals and teleprinter-subscriber terminals. The first operating mode will now be described.

The data switching system DVA is capable of switching connections in automatic dialing traffic as well as in manual switching operation. For automatic dialing traffic, the Telex-subscriber provides dial information, which designates the subscriber to be called, in this case a teleprinter-subscriber, in a known manner. In the case of international traffic this dial information also contains the country code of the respective country it is desired to reach. In conjunction with the respective teleprinter-subscriber provided dial information, a connection is then automatically established by the teleprinter and data switching system EDS designed as an automatic dialing device.

Teleprinter-subscribers, who on the contrary, desire a manually switched connection (calling teleprinter-subscribers) provide, in the case of an international connection, via their teleprinter-subscriber terminal, a special selection prefix signal, "00" for example, in addition to the country code for the country to be reached and the call number of the teleprinter-subscriber terminal device being called, to the teleprinter and data switching system EDS. Upon the appearance of such a selection prefix character, this generates a job under the control of the program control unit PE for the manual switchboard HVE with the selection data for the respective calling and called teleprinter-subscriber terminal and additionally enters this job into the aforementioned job memory WFI of the memory unit SE. Therewith the job is given a consecutive job number allocated by the program control unit PE. The respective calling teleprinter-subscriber terminal periodically receives a waiting signal, in the form of a teleprinter character sequence "MOM", for example, as an indication that it is connected to the job memory WF1.

The job memory WF1 is designed as a write-/read memory with a plurality of memory locations for the storage of jobs. The memory locations are thereby chained together in such manner that in conjunction with their job numbers the jobs may be output again later in the sequence in which they were input. In order to avoid an overflow of this job memory with jobs that appertain to connections in a specific direction (to specific countries), the number of jobs assumable per direction is limited by the program control module PE.

The jobs stored in the job memory WF1 may be called from the manual switchboard HVE through the entry of control signals. This entry is produced with the aid of the keyboard T connected with the microprocessor PC1. On the basis of these control signals which are transmitted to the teleprinter and data switching system EDS via the control leads SL, the stored jobs can be selectively output in the sequence in which they were input, either direction independent or direction dependent. Through such a direction dependent output of jobs, it is possible, for example, in the case of a number of manual switchboards, to switch connections for specific directions only, from each of these.

Upon the output of a control signal to the respective job to be processed next is transmitted to the manual switchboard. The data lines A1, B1 as well as the control line SL may be used in combination for this transmission. The selection data contained in such a transmitted job are received by the microprocessor PC1 and presented to the operator of the manual switchboard via the video display BS. The operator continues to try to establish a connection with the desired teleprinter-subscriber terminal (called terminal) by entering a corresponding control signal in conjunction with the selection data. For the setting-up of this connection the selection data for the teleprinter-subscriber terminal to be called is sent to the teleprinter and data switching system EDS, which attempts, under partial use by the automatic dialing traffic applicable switching procedures as well, to reach the desired teleprinter-subscriber terminal. Data regarding a successful attempt are communicated to the microprocessor PC1 and presented on the video dispaly BS. If the desired Telex-subscriber is reachable, the through connection between the two teleprinter-subscriber terminals participating in the connection is then initiated by the manual switchboard HVE. Otherwise, a renewed attempt is made to establish a connection.

Prior to the actual through-connection, the data required for message accounting is next determined, such as entries for metering zones. Once these data are determined, the through-connection of the calling and called teleprinter-subscriber terminals follows under the control of the teleprinter and data switohing system EDS, with the aid of the through-connection procedures, which are also used in part in automatic dialing traffic.

In the course of this through connection the answerback codes are exchanged between the two terminal devices. The now established connection then takes place over the two data lines A1 and B1 of the manual switchboard, while the two data lines are connected together in the microprocessor arrangement PC1 through a controllable switch. Upon confirmation, through monitoring, that the calling teleprinter-subscriber terminal is able to transmit its information according to procedure, the connection is transferred through the entry of a corresponding control signal, from the manual switchboard HVE to the teleprinter and data switching system EDS. The manual switchboard is then again available for the processing of a further job. The clearing of the connection occurs exclusively through the teleprinter and data switching system.

As already explained, the manual switchboard HVE has an additional microprocessor PC2 connected to the data leads A2 and B2. By means of this additional microprocessor, an additional job may be processed concurrently, as previously described, through the use of the keyboard T of the microprocessor PC1.

Jobs involving booking of calls also be processed with the aid of the manual switchboard HVE. Such jobs are so assembled by the teleprinter and data switching system EDS that, they respectively show entries related to the current time, in addition to the already indicated selection data and a job number. These jobs are entered into the aforementioned job memory WF2, which is constructed in an identical manner to the job memory WF1. This job memory can be alternatively accessed with the job memory WF1 from the manual switchboard HVE through the output of control signals. On the basis of the current time (real-time), entries contained in the aforementioned jobs are immediately output for processing during activation of the job memory WF2. The desired processing time for these entries is transmitted during an interactive communication with the respective teleprinter-subscriber. In conjunction with these entries the operator of the manual switchboard replaces the current time entries contained in the respective job with time entries, which indicate the earliest desired processing time period and inputs the respective modified job back into the job memory WF2. During subsequent activations, the jobs entered into the job memory WF2, are output for booking of call jobs, specified for a given point in time, in the sequence in which they were input. Thereby, an attempt is made, for each job, to reach the respective called teleprinter-subscriber terminal. In the event this is successful, the respective calling teleprinter-subscriber terminal is called in the answerback mode and the connection to the respective called teleprinter-subscriber terminal is put through in the manner previously described. In the event the respective called teleprinter-subscriber terminal cannot be reached, the momentarily unprocessable job is provided with entries relative to the processing time period and is again entered into the job memory WF2.

Several entries for the establishment of a connection that is to be manually switched are already provided by the teleprinter-subscribers desiring such a connection. Should the entries provided for the establishment of manually switched connections be inadequate however, a destination network file of the teleprinter and data switching system EDS may be accessed through the output of control signals from the manual switchboard HVE. Several interconnect possibilities (transit paths) are stored in this destination network file, sorted according to country code. Through these entries the operator of the manual switchboard can, when required, complete the selection data already available to him, and continue to establish the connections in the manner already described.

Supplementing the first operating mode of the manual switchboard HVE it is noted that instead of the two separate job memories WF1 and WF2 a single job memory may also be used, which contains several entries which make it possible to process both direction dependent as well as process time dependent jobs.

The second operating mode of the manual switching device will now be described. In the second operating mode, transition traffic from Teletex-subscriber terminals to teleprinter-subscriber terminals, reachable only via manually switched connections is possible. Should the Teletex-subscriber desire s transition traffic he so informs the teleprinter and data switching system EDS through the selection data provided by the start of selection signal. Upon the appearance of such a start of selection signal the teleprinter and data switching system takes over the data signals following the selection data sequence provided by the Teletex-subscriber terminal and transmits these data signals, together with the previously received selection data, to one of the Teletex interface circuits TA1 and TA2 corresponding to the Teletex conventions. These Teletex interface circuits respectively have an additional job memory, in which data signals and associated selection data emcompassing jobs are then buffered prior to processing via the manual switchboard. The jobs can thereby again be supplemented with data in the form of a job number, which may, for example, be provided by the microprocessor associated with the respecive Teletex interface circuit on request, and where required in the form of related to a processing time period, in order that the jobs may be output both direction dependent and/or process time dependent in the sequence in which they were input.

Should a job for the manual switchboard reside in one of the Teletex interface circuits, which may for example be the Teletex interface circuit TA1, it outputs a job status signal to the microprocessor PC1. Based upon this job status signal the operator then requests the selection data contained in the next job to be processed and attempts to establish a connection to the desired teleprinter-subscriber terminal through the entry of a control signal via the keyboard T, in the previously described manner. Should such an attempt be successful, the operator, after querying the answer back unit available in the teleprinter-subscriber terminal, via a control signal output to the Teletex interface circuit TA1, retrieves the stored data signals for the connection just established and instigates its transmission to the teleprinter-subscriber terminal. During such a transmission, which occurs via the microprocessor PC1 and the data line B1 the microprocessor PC1, additionally undertakes a code conversion from Teletex into the teleprinter format. If the operator of the manual switching device HVE has determined that the data signals have reached the teleprinter-subscriber terminal in a normal procedure, he prepares an acknowledgement for the Teletex subscriber terminal from which the just transmitted data signals have been received. He obtains the call number for this Teletex-subscriber terminal from the job still stored in the Teletex interface circuit TA1. The acknowledgement also contains the answer back code of the teleprinter-subscriber terminal that has received the data signals. This acknowledgement thus prepared is subsequently transmitted in the form of an acknowledgement call via the Teletex interface circuit TA1 and the teleprinter and data switching system EDS. Should this acknowledgement call also be successfully terminated, the job still stored in the Teletex interface circuit TA1 is cleared.

The second microprocessor PC2 in combination with the Teletex interface circuit TA2, may also be used in the second operating mode just described, to simultaneously process an additional job in transition traffic between a Teletex subscriber terminal and a Telex subscriber-terminal. Moreover it is also possible, depending on the prevailing traffic appearing during transition traffic to design the Teletex interface circuits in such a manner that these can take over a number of jobs appearing on the transmission lines connected to the teleprinter and data switching system EDS. In a like manner, it is possible to connect the Teletex interface circuits with a number of microprocessors associated with different manual switchboards.

The two aforementioned operating modes are selectable by the operator of the manual switchboard HVE, so that it is also possible to process jobs with and without transition traffic, simultaneously.

Only those examples were described in which connections between two teleprinter-subscriber terminals in the first operating mode of the manual switchboard, and connections between Teletex-subscriber terminals and teleprinter-subscriber terminals in the second operating mode are established. However, with the aid of the switching facility, subscriber terminals operating with the same data transmission protocols and procedures in the first operating case and/or subscriber terminals operating with different data transmission protocols and procedures in the second case are generally also connectable. Connections between Teletex subscriber terminals and facsimile terminals (FAX) and/or between facsimile terminals and teleprinter-subscriber terminals are examples of the second operating mode.

It is also noted that facilities such as those having arrangements which develop the processing of jobs automatically in accordance with their capacity, instead of the manually operable microprocessors are also included in manual switchboards used with the present invention.

I claim:

1. A circuit for transmission of data signals between first subscriber terminals operating with a first data transmission protocol and with second subscriber terminals operating with a data transmission protocol different from the first data transmission protocol, through a data switching system with conversion of the data signals provided by the first subscriber terminals into data signals compatible with the second subscriber terminals, such that the first subscriber terminals and the second subscriber terminals are connected to separate line circuits of a first and second group of line circuits, comprising:

at least one manual switchboard having at least one job memory unit and a control unit connected to at least one line circuit of each of said first and second groups of line circuits, such that jobs sent from the data switching system for manual switching connections and which include the selection data and the data signals from the first subscriber terminals are input to the memory unit together with a continuously assigned job number and output in the sequence in which they were input, under control of control signals provided by the control unit, such that said control unit only maintains, for each job, the selection data required for setting-up of a connection, and the data signals for a conversion and associated forwarding to the second subscriber terminal.

2. A circuit according to claim 1 wherein:
said control unit includes means for receiving a job status signal from the job memory for a job to be processed, and means for deriving the job number for the respective job.

3. A circuit according to claim 1 wherein the control unit includes means for forwarding the data signals; and
means for providing an acknowledgement signal to the first subscriber terminal from which the data signals were previously received.

4. A circuit according to claim 1 wherein the control unit comprises a microcomputer.

* * * * *